United States Patent
Clarke et al.

(10) Patent No.: US 9,146,407 B2
(45) Date of Patent: Sep. 29, 2015

(54) FAIL-SAFE ELECTRO-ACTIVE LENSES AND METHODOLOGY FOR CHOOSING OPTICAL MATERIALS FOR FAIL-SAFE ELECTRO-ACTIVE LENSES

(71) Applicant: Mitsui Chemicals, Inc., Tokyo (JP)

(72) Inventors: Roger Clarke, Melbourn Hertfordshire (GB); Joshua N. Haddock, Roanoke, VA (US)

(73) Assignee: MITSUI CHEMICALS, INC., Tokyo (JP)

(*) Notice: Subject to any disclaimer, the term of this patent is extended or adjusted under 35 U.S.C. 154(b) by 5 days.

(21) Appl. No.: 13/961,624

(22) Filed: Aug. 7, 2013

(65) Prior Publication Data

US 2014/0043672 A1    Feb. 13, 2014

Related U.S. Application Data

(60) Provisional application No. 61/681,817, filed on Aug. 10, 2012.

(51) Int. Cl.
G02C 7/00 (2006.01)
G02C 7/02 (2006.01)
G02C 7/04 (2006.01)
G02C 7/08 (2006.01)

(52) U.S. Cl.
CPC ............ *G02C 7/083* (2013.01); *G02C 2202/20* (2013.01)

(58) Field of Classification Search
USPC ......... 359/315–318, 322–324, 237, 245, 247, 359/251–254, 267, 272; 351/159.03, 351/159.01, 159.11, 159.15, 159.39, 159.44
See application file for complete search history.

(56) References Cited

U.S. PATENT DOCUMENTS

| | | | |
|---|---|---|---|
| 5,013,141 A | 5/1991 | Sakata | |
| 7,728,949 B2 | 6/2010 | Clarke et al. | |
| 2006/0095128 A1 | 5/2006 | Blum et al. | |
| 2007/0052920 A1* | 3/2007 | Stewart et al. | 351/159 |
| 2007/0216851 A1 | 9/2007 | Matsumoto | |
| 2008/0180630 A1 | 7/2008 | Clarke et al. | |
| 2012/0199995 A1* | 8/2012 | Pugh et al. | 264/1.36 |

OTHER PUBLICATIONS

U.S. Appl. No. 61/681,817, filed Aug. 10, 2012.
International Search Report corresponding to the PCT/US2013/054346 application, dated Jan. 29, 2014.

* cited by examiner

*Primary Examiner* — Scott J Sugarman
*Assistant Examiner* — Brandi Thomas
(74) *Attorney, Agent, or Firm* — Sterne, Kessler, Goldstein & Fox, P.L.L.C.

(57) ABSTRACT

A fail-safe electro-active lens is presented in which the lens includes a substrate having a diffractive relief surface and an electro-active material in optical communication with the substrate. The electro-active material can include a nematic liquid crystal host. The refractive index of the substrate is equal to the average refractive index of the liquid crystal at a wavelength in the blue light spectrum.

14 Claims, 10 Drawing Sheets

US 9,146,407 B2

FAIL-SAFE ELECTRO-ACTIVE LENSES AND METHODOLOGY FOR CHOOSING OPTICAL MATERIALS FOR FAIL-SAFE ELECTRO-ACTIVE LENSES

CROSS REFERENCE TO RELATED APPLICATIONS

This application claims the benefit of U.S. Appl. No. 61/681,817 filed on Aug. 10, 2012, which is hereby incorporated by reference in its entirety.

BACKGROUND OF THE INVENTION

1. Field of the Invention

The present invention relates to fail-safe electro-active ophthalmic lenses, lens designs, lens systems, and eyewear products or devices utilized on, in, or about the eye wherein the material for the substrate and liquid crystal are chosen to achieve increased visual acuity.

2. Background Art

An electro-active element is a device with an optical power that is alterable with the application of electrical energy. An electro-active element can be constructed from two substrates. An electro-active material can be disposed between the two substrates. The substrates can be shaped and sized to ensure that the electro-active material is contained within the substrates and cannot leak out. One or more electrodes can be disposed on each surface of the substrates that is in contact with the electro-active material. The electro-active element can include a controller to apply one or more voltages to each of the electrodes. The electro-active element can include a power supply operably connected to the controller. When electrical energy is applied to the electro-active material by means of the electrodes, the electro-active material's index of refraction can be altered thereby changing an optical property of the electro-active element, such as its focal length or diffraction efficiency, for example.

An electro-active element can be in optical communication with a base lens. The electro-active element can be embedded within or attached to a surface of the base lens to form an electro-active lens. A base lens can be an optical substrate or a conventional optical lens. The optical substrate can be a lens blank. A lens blank is a device made of optical material that can be shaped into a lens. A lens blank can be "finished", meaning that the lens blank has both of its external surfaces shaped into refractive external surfaces. A finished lens blank has an optical power which can be any optical power including zero or plano optical power. A lens blank can be "semi-finished", meaning that the lens blank has been shaped to have only one finished refractive external surface. A lens blank can be "unfinished", meaning that neither external surface of the lens blank has been shaped into a refractive surface. An unfinished surface of an unfinished or semi-finished lens blank can be finished by means of a fabrication process known as free-forming or by more traditional surfacing and polishing. A finished lens blank has not had its peripheral edge shaped, edged, or modified to fit into an eyeglass frame.

An electro-active element can also be embedded within or attached to a surface of a conventional optical lens to form an electro-active lens. A conventional optical lens is any device or portion of a device that causes light to converge or diverge. A lens can be refractive or diffractive. A lens can be either concave, convex, or planar on one or both surfaces. A lens can be spherical, cylindrical, prismatic, or a combination thereof. A lens can be made of optical glass, plastic, thermoplastic resins, thermoset resins, a composite of glass and resin, or a composite of different optical grade resins or plastics. A lens can be referred to as an optical element, optical preform, optical wafer, finished lens blank, or optic. It should be pointed out that within the optical industry a device can be referred to as a lens even if it as zero optical power known as plano or no optical power). The conventional optical lens can be a single focus lens or a multifocal lens such as a Progressive Addition Lens or a bifocal or trifocal lens.

The electro-active element can be located in the entire viewing area of the electro-active lens or in just a portion thereof. The electro-active element can be spaced from the peripheral edge of the optical substrate or conventional optical lens in order to allow the electro-active lens to be edged for spectacle frames. The electro-active element can be located near the top, middle or bottom portion of the lens. It should be noted that the electro-active element can be capable of focusing light on its own and does not need to be combined with an optical substrate or conventional optical lens.

An electro-active element can be capable of switching between a first optical power and a second optical power. The electro-active element can have the first optical power in a deactivated state and can have the second optical power in an activated state. The electro-active element can be in a deactivated state when one or more voltages applied to the electrodes of the electro-active element are below a first predetermined threshold. The electro-active element can be in an activated state when one or more voltages applied to the electrodes of the electro-active element are above a second predetermined threshold. Alternatively, the electro-active element can be capable of "tuning" its optical power such that the electro-active element is capable of providing a continuous, or substantially continuous, optical power change between the first optical power and the second optical power. In such an embodiment, the electro-active element can have the first optical power in a deactivated state and can have an optical power between a third optical power and the second optical power in an activated state, wherein the third optical power is above the first optical power by, a predetermined amount.

Electro-active lenses can be used to correct for conventional or non-conventional errors of the eye. The correction can be created by the electro-active element, by the optical substrate or the conventional optical lens, or by a combination of the two Conventional errors of the eye include lower order aberrations such as myopia, hyperopia, presbyopia, and astigmatism. Non-conventional errors of the eye include higher order aberrations that can be caused by ocular layer irregularities.

An electro-active element can include a liquid crystal. Liquid crystal is particularly well suited for electro-active lenses because it has an index of refraction that can be altered by generating an electric field across the liquid crystal. Lastly, the operating voltage of some commercially available liquid crystals for display applications, is typically less than 5 volts. Furthermore, some liquid crystals possess bulk resistivities on the order of $10^{11}$ Ω-cm or more, which reduces electrical power consumption.

The development of electro-active lens technology for ophthalmic applications places certain requirements on the technology that are critical to its success. One such requirement is that in the case of failure, the user of the electro-active lens must, not be placed in a dangerous situation. Such a requirement is known as fail-safe operation. For example, a user can have electro-active spectacle lenses designed for the correction of presbyopia. Presbyopia is the loss of accommodation of the crystalline lens of the human eye that accompanies aging. This loss of accommodation first results in an inability to focus on near distance objects and later results in an inability to focus on intermediate distance objects. In the user's electro-active spectacle lenses, a conventional optic can correct for the user's far distance refractive error, if any. An electro-active element, when activated, can provide additional optical power to correct for the user's near and/or intermediate distance refractive error. When the user engages in far distance tasks such as driving, the electro-active element is deactivated thereby providing the user with proper far distance correction. When the user engages in near or intermediate distance tasks such as reading a book or looking at a computer screen, the electro-active lens is activated thereby providing the user with proper near distance correction. If the power source or the controller of the electro-active spectacle lenses should fail while the user is driving a car, it is vitally important that the electro-active element be capable of defaulting to a deactivated state so that the user is provided with proper far distance correction.

A second requirement for electro-active lens technology is that the electro-active lens must be insensitive to the polarization of the light it is meant to focus. Light is a transverse wave composed of electromagnetic field vectors which oscillate perpendicular to the light wave's direction of propagation. The path that a given field vector traces out in time (in most of optics only the electric field vector is considered) can be thought of as the polarization state (linear polarization for a linear path, circular for a circular path, etc.). The light emitted from most illumination sources (e.g. the sun, incandescent and fluorescent lamps) can be described as unpolarized or randomly polarized in which the direction of the electric field vector oscillates randomly with time. Despite the random oscillations of the electric field vector, at any given instant, the electric field vector can be broken into two orthogonal vector components, as can be done for perfectly polarized light. As is well known in the art, these vector components, by way of example only, can themselves be linearly polarized and orthogonal in a Cartesian sense, or circularly polarized, and orthogonal in that they propagate with right and left handed twists. In other instances, the electric field vector can be broken down into two orthogonal components which are elliptically polarized (of which circularly polarized is a unique form).

An effective electro-active lens technology must be insensitive to the polarization of light, i.e. it must be able to focus light having any polarization state. However, most liquid crystalline materials are birefringent (exhibit an anisotropy of the refractive index) and as such are highly polarization sensitive. Optical waves with different polarization states traveling through a birefringent medium can experience a different index of refraction depending upon their direction of travel. For liquid crystal display applications the issue of polarization sensitivity is addressed through the use of dichroic polarizing films to only allow linearly polarized light to enter the display. As mentioned above, randomly polarized light waves have an electric field vector which oscillates randomly with time. Malus' law states that the intensity of a light wave passing through a linear polarizer is proportional to $\cos^2(\theta)$, where $\theta$ is the angle between the light wave's polarization direction (the electric field vector's direction) and the linear polarizer's direction. Since the incoming light wave is randomly polarized, it contains all $\theta$'s at random. Therefore, the intensity of the light wave passing through the linear polarizer is the average of $\cos^2(\theta)$, which is 50%. Thus, using a polarizing film blocks 50% of randomly polarized incoming light making it an unattractive option for electro-active lenses since it is important to focus all incoming light.

Polarization sensitivity is addressed differently depending, in a large part, on the optical properties of the particular liquid crystal being utilized. A nematic liquid crystal is optically uniaxial and possesses a single axis of symmetry with respect to its optical properties. This axis is known as the "director". The orientation of the director varies throughout the bulk of a nematic liquid crystal layer but through the use of alignment layers, can be made, on average, to point in a single direction, called the alignment direction. An alignment layer is a thin film, which, by way of example only, can be less than 100 nanometers thick and constructed from a polyimide material. The thin film is applied to the surface of substrates that comes into direct contact with liquid crystal. Prior to assembly of the electro-active element, the thin, film is buffed in one direction (the alignment direction) with a cloth such as velvet. When the liquid crystal molecules come in contact with the buffed polyimide layer, the liquid crystal molecules preferentially lie in the plane of the substrate and are aligned in the direction in which the polyimide layer was rubbed (i.e., parallel to the surface of the substrate). Alternatively, the alignment layer can be constructed of a photosensitive material, which when exposed to linearly polarized UV light, yields the same result as when a buffed alignment layer is used. Thus, in the absence of an electric field, the director of the liquid crystal molecules points in the same direction as the alignment direction. In the presence of an electric field, the liquid crystal molecules orient in the direction of the electric field. In an electro-active element, the electric field is perpendicular to the alignment layer. Thus, if the electric field is strong enough, the director of the liquid crystal molecules will be perpendicular to the alignment direction. If the electric field is not strong enough, the director of the liquid crystal molecules will point in a direction somewhere between the alignment direction and perpendicular to the alignment direction.

Uniaxial optical materials possess two unique refractive indices, an ordinary refractive index ($n_o$) and an extra-ordinary refractive index ($n_e$). The birefringence of the uniaxial optical material, $\Delta n$, is defined as $\Delta n = n_e - n_o$. An optical wave traveling in a direction parallel to the liquid crystal's director will experience the ordinary refractive index ($n_o$) regardless of the optical wave's state of polarization as an optical wave is a transverse wave where the electric field (the portion of the wave that experiences the phase delay due to the index of refraction) oscillates in a direction perpendicular to the direction of propagation, as is well known in the art. However, an optical wave traveling along any other path will experience a refractive index between the values of $n_o$ and $n_e$; the exact value of the refractive index depends upon the optical wave's state of polarization and its path through the material. As mentioned above, if the uniaxial material is in contact with an alignment layer and no electric field is applied, the director of the uniaxial material will be in the same direction as the alignment direction. Therefore, an incoming light wave, which is traveling in a direction perpendicular to the layer of uniaxial material (and as such is polarized parallel to the director), will experience an index of refraction between the values of $n_o$ and $n_e$, depending on the polarization state of the incoming light wave. As the electric field is increased, the director of the material begins to point in a direction somewhere between the alignment direction and perpendicular to the alignment direction. An incoming light wave, which is traveling in a direction perpendicular to the layer of uniaxial material, is no longer polarized parallel to the material's director but is not perpendicular to the director either. Therefore, this light wave will also experience a differing index of refraction depending on its polarization state. If the electric field is strong enough, the director of the liquid crystal molecules will be perpendicular to the alignment direction. In this case, incoming light waves will be traveling in a direction parallel to the director and the applied electric field and the incoming light waves will be polarized in a direction perpendicular to the director and the applied electric field. In this scenario, light waves will experience the ordinary index of refraction ($n_o$) regardless of its polarization state.

An electro-active lens has the ability to change the focusing power of the lens. Changing the focusing power of the lens is accomplished by altering the index of refraction of the electro-active element's electro-active material. However, changing the index of refraction of a uniaxial material to an intended index of refraction between $n_o$ and $n_e$ is polarization sensitive. As mentioned above, all unpolarized light waves can be thought of as being linearly polarized, where the direction of polarization changes randomly in time. Thus, for the same reason that only 50% of randomly polarized light passes through a linear polarizer, only 50% of the incoming randomly polarized light will experience the intended index of refraction. Therefore, if an electro-active lens that operates in the presence of unpolarized ambient light is constructed from a single layer of nematic liquid crystal, it will only focus half of the incident light. This will result in a drastic and unacceptable drop in visual acuity for the wearer.

A polarization insensitive electro-active lens using nematic liquid crystal that focuses all incident light typically requires the use of two layers of liquid crystal, placed in series, and arranged such that the alignment directions of the layers are orthogonal to each other. As polarized light can be broken down into two orthogonal components, the orthogonal orientation of the alignment directions ensures that the orthogonal components of light of any polarization will be properly focused by either the first layer of liquid crystal or by the second layer of liquid crystal. The drawback to this approach is that the requirements for manufacturing and operating the lens (e.g., materials, electrical connections, and electrical power consumption) will be effectively doubled.

A third requirement for electro-active lens technology is that the electrical power consumption must be as small as possible. As mentioned above, using two layers of nematic liquid crystal is not an attractive option since the power requirements effectively double. Similarly, a single layer of polarization insensitive polymer dispersed liquid crystal, as described by Nishioka, et al. in U.S. Pat. No. 7,009,757, is undesirable since the operating voltages are prohibitive for spectacle lens applications.

A fourth requirement for electro-active lens technology is that the number of electrical connections per lens must be kept at a minimum. Ideally the number of electrical connections should be limited to two: one to provide a zero-voltage reference (commonly referred to as "ground") and another to provide a zero-DC bias time varying voltage (i.e., the time averaged voltage is zero, such that there is no DC offset). While this is achievable with a single layer of polarization insensitive polymer dispersed liquid crystal, the voltages required for the operation of this liquid crystal prohibit the use of the technology in spectacle lenses.

Thus, there is a need for an electro-active lens technology which meets all four of the aforementioned requirements.

BRIEF SUMMARY OF THE INVENTION

Some embodiments of the present invention provide a device including an electro active lens having a substrate with a diffractive relief structure and, an electro-active material in optical communication with the substrate. The substrate has a refractive index that is a first function of wavelength. The electro-active material includes a nematic liquid crystal host having an average refractive index that is a second function of wavelength different, from the first function of wavelength. The electro-active lens has an activated state and a deactivated state. The refractive index and the average refractive index are equal at a crossover wavelength and the crossover wavelength is preferably in the blue light spectrum.

Some embodiments of the present invention, provide a device including an electro-active lens having a substrate with a diffractive relief structure and an electro-active material in optical communication with the substrate. The substrate has a refractive index that is a first function of wavelength. The electro-active material includes a nematic liquid crystal host having an average refractive index that is a second function of wavelength different from the first function of wavelength. The substrate has a higher Abbe number than the nematic liquid crystal host. The refractive index and the average refractive index are equal at a crossover wavelength and the crossover wavelength is preferably less than 550 nanometers.

Some embodiments of the present invention provide a device including an electro-active lens having a substrate with a diffractive relief structure and an electro-active material in optical communication with the substrate. The substrate has a refractive index that is a first function of wavelength. The electro-active material includes a nematic liquid crystal host having an average refractive index that is a second function of wavelength different from the first function of wavelength. The refractive index and the average refractive index decrease from 400 nanometers to 700 nanometers. A difference between a change in the average refractive index from 400 nanometers to 700 nanometers and a change in the refractive index from 400 nanometers to 700 nanometers is preferably at least 0.05.

In some embodiments, the crossover wavelength is less than 500 nanometers, preferably in the blue light spectrum. In some embodiments, the crossover wavelength is less than 495 nanometers, or is less than 480 nanometers.

In some embodiments, the electro-active lens has a first order diffraction efficiency in the deactivated state of less than 10% at the crossover wavelength and the electro-active lens has a first order diffraction efficiency in the activated state of greater than 90% at the crossover wavelength.

In some embodiments, the device is a pair of spectacles.

In some embodiments, the electro-active material is a polarization insensitive cholesteric liquid crystal material comprising the nematic liquid crystal host.

In some embodiments, the substrate has a refractive index in a range from 1.64 to 1.7 at a wavelength of 550 nm.

In some embodiments, the nematic liquid crystal host has an average refractive index in a range from 1.62 to 1.68 at a wavelength of 550 nm.

In some embodiments, the average refractive index is greater than the refractive index at wavelengths less than the crossover wavelength and the average refractive index is less than the refractive index, at wavelengths greater than the crossover wavelength.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

DETAILED DESCRIPTION OF THE INVENTION

Figure 1:
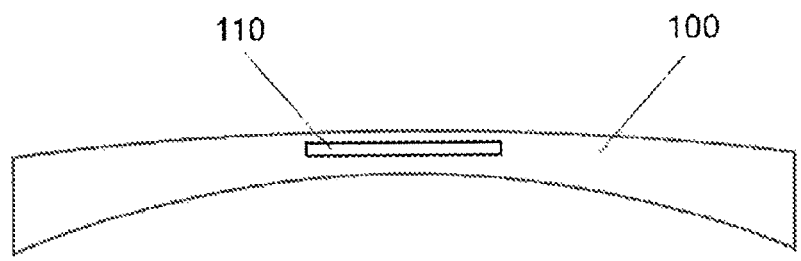
FIG. 1 shows an embodiment of the present invention in which an electro-active element is embedded within an electro-active lens.

In some embodiments, a liquid crystalline material is polarization insensitive and has a low operating voltage requirement. In some embodiments, the inventive liquid crystalline material can be included in an electro-active element. In some embodiments, the inventive electro-active element includes a substrate having a refractive index that is equal to the average refractive index of the liquid crystal at a wavelength of less than 550 nm, preferably in the blue light spectrum. The inventive electro-active element can be fail-safe and can require only two electrical connections for operability. In some embodiments, the inventive electro-active element can be included in a static electro-active lens. The static electro-active lens can at least partially correct for refractive errors of the eye such as myopia, hyperopia, astigmatism, presbyopia, and higher-order aberrations. The electro-active element can at least partially correct for any or all of the aforementioned refractive errors. In some embodiments, the electro-active lens can be incorporated in a pair of spectacles.

In some embodiments, the liquid crystalline material is a type of cholesteric liquid crystal. As described below, the cholesteric liquid crystalline material can include a nematic liquid crystal host. Cholesteric liquid crystalline materials, like nematic liquid crystals, are optically uniaxial and are therefore birefringent (i.e., they are characterized by ordinary ($n_o$) and extraordinary ($n_e$) refractive index values). However, in a cholesteric liquid crystal, the director rotates in a helical manner over the thickness of the material. The helical rotation of the director is characterized by an axis of rotation, a handedness (either right or left), and a "twist pitch" p. The twist pitch is defined as the length along the axis of rotation over which the director rotates by a full 360 degrees. Optical waves having a wavelengths comparable to the twist pitch and traveling in a direction perpendicular to the liquid crystal's director (and thus polarized in a direction parallel to the director) will experience an "average" refractive index value $n_{avg}$, where $n_{avg}=(n_o+n_e)/2$. Because the value of $n_{avg}$ is substantially constant with respect to the polarization state of the incident optical wave, the cholesteric liquid crystalline material is polarization insensitive. In the presence of an electric field applied in a direction perpendicular to the alignment layer, most of the material's directors align with the field, which effectively unwinds the director helix. As such, an optical wave traveling along the director axis of rotation will experience a continuous and polarization insensitive change in the value of the refractive index between the average value ($n_{avg}$) and the ordinary value ($n_o$). If the electric field is strong enough, the directors of the cholesteric liquid crystalline material will be substantially parallel to the applied electric field and an optical wave traveling in a direction perpendicular to the layer of cholesteric liquid crystalline material will experience a refractive index of the ordinary value ($n_o$).

If the cholesteric liquid crystalline material is in contact with an alignment layer and no electric field is applied, the director of the material at the interface between the alignment layer and the cholesteric liquid crystalline material will be in the same, direction as the alignment direction. Therefore, an incoming light wave, which is traveling in a direction perpendicular to the layer of cholesteric liquid crystalline material and parallel to the axis of rotation, will experience an index of refraction comparable to $n_{avg}$, regardless of the polarization state of the incoming light wave. As the electric field is increased, the director of the material begins to point somewhere between the alignment direction and perpendicular to the alignment direction and an incoming light wave will experience a refractive index between the average value ($n_{avg}$) and the ordinary value ($n_o$) regardless of its polarization state. If the electric field is strong enough, the director of the liquid crystal molecules will be perpendicular to the alignment direction. In this case, incoming light waves, which are traveling perpendicular to the layer of cholesteric liquid crystalline material and parallel to the axis of rotation will experience the ordinary index of refraction ($n_o$) regardless of its polarization state.

FIG. 1 shows an embodiment in which an electro-active element 110 is embedded within electro-active lens 100. The electro-active element can include a cholesteric liquid crystalline material. The electro-active lens can be formed from a conventional optical lens or from an optical substrate.

Figure 2A:
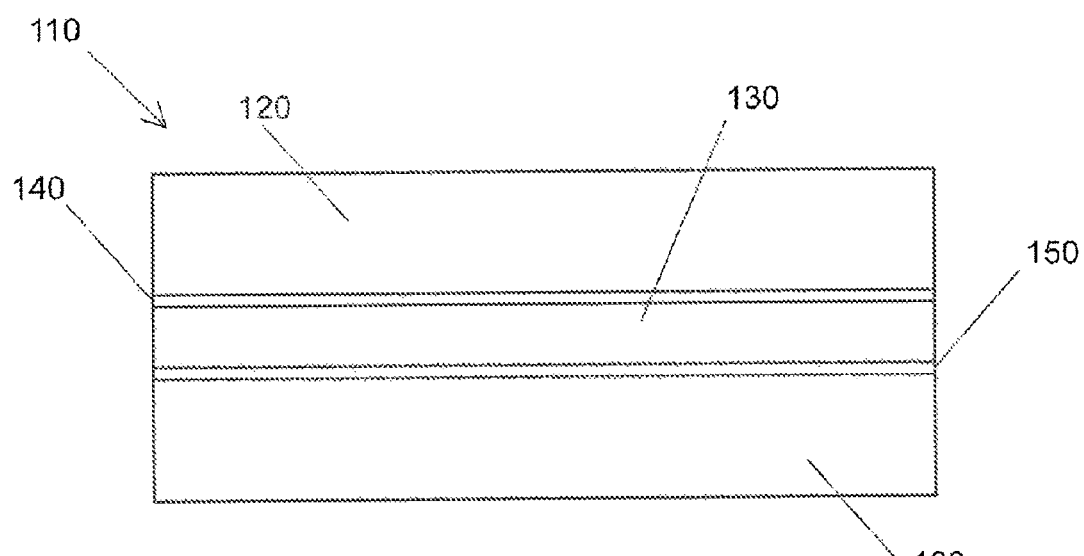
FIG. 2a shows a detailed view of embodiments of the electro-active element shown in FIG. 1 having substantially flat and parallel substrates.
Figure 2B:
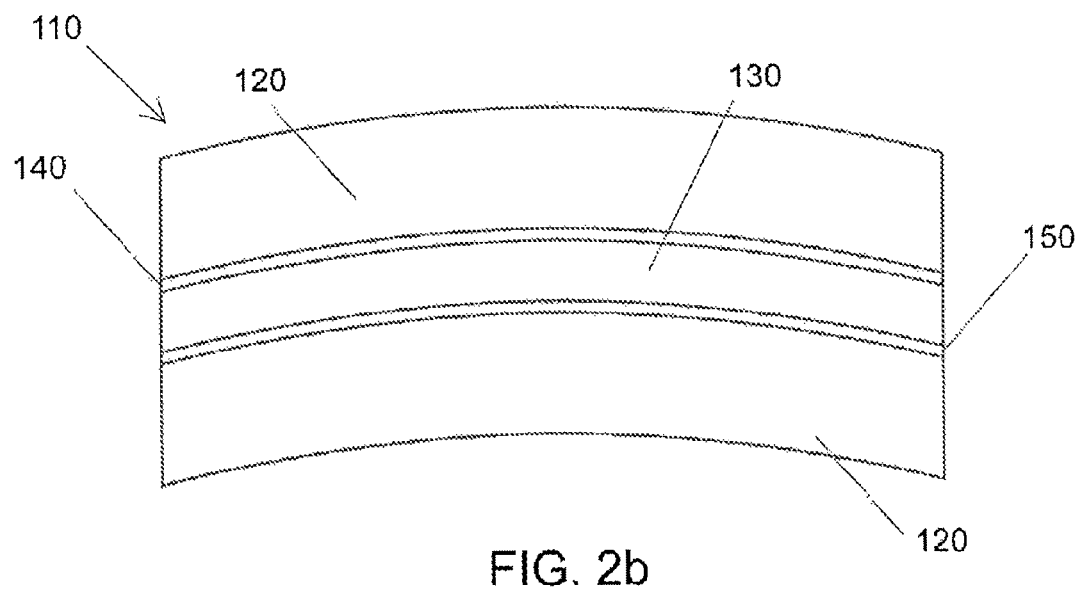
FIG. 2b shows a detailed view of embodiments of the electro-active element shown in FIG. 1 having substantially curved and parallel substrates.

FIGS. 2a-2b show a detailed view of embodiments of the electro-active element 110. The electro-active element can be constructed from two or more optically transparent substrates 120 having a cholesteric liquid crystalline material 130 therebetween. The substrates can be formed to constrain a thin layer of the cholesteric liquid crystalline material. The thickness of the layer can be, for example, less than 100 μm but is preferred to be less than 10 μm. In FIG. 2a, the substrates are shown as substantially flat and parallel while in FIG. 2b the substrates are shown as substantially curved and parallel. The substrates can be curved to match the curvature of the electro active lens. The substrates have a known and substantially equal refractive index ($n_{sub}$). The substrates can be coated with an optically transparent electrode 140 or 150 on the side of the substrate that is in contact with the cholesteric liquid crystalline material. The optically transparent electrodes are used to apply an electric field to the liquid crystal and can, for example, comprise any of the known transparent conductive oxides (such as ITO) or a conductive organic material (such as PEDOT:PSS or carbon nano-tubes). The thickness of the optically transparent electrode layer can be, for example, less than 1 μm, but is preferred to be less than 0.1 μm. The maximum lateral dimension of the substrates can be, for example, on the order of 10 mm to 80 mm. However, the substrates can be smaller for ophthalmic applications other than spectacle lenses such as contact lenses or intraocular lenses. The substrates can have a size and configuration that allow the peripheral edge of the electro-active spectacle lens to be cut to fit within a specific spectacle lens frame (i.e., edged) while ensuring that the cholesteric liquid crystalline material remains constrained between said substrates.

In some embodiments, the electro-active element can be assembled from substrates physically separate from the conventional optical lens or from the optical substrate. In these embodiments, the thickness of the substrates can be, for example, greater than 100 μm but less than 1 mm, and preferably on the order of 250 μm. In other embodiments, one of the substrates can form part of the finished spectacle lens, and thus, one substrate can be substantially thicker than the other. In these embodiments, for example, the substrate, which forms part of the finished electro-active spectacle lens, can be on the order of 1 mm to 12 mm thick. The thickness of the other substrate can be greater than 100 μm but less than 1 mm, and preferably on the order of 250 μm.

Figure 3:
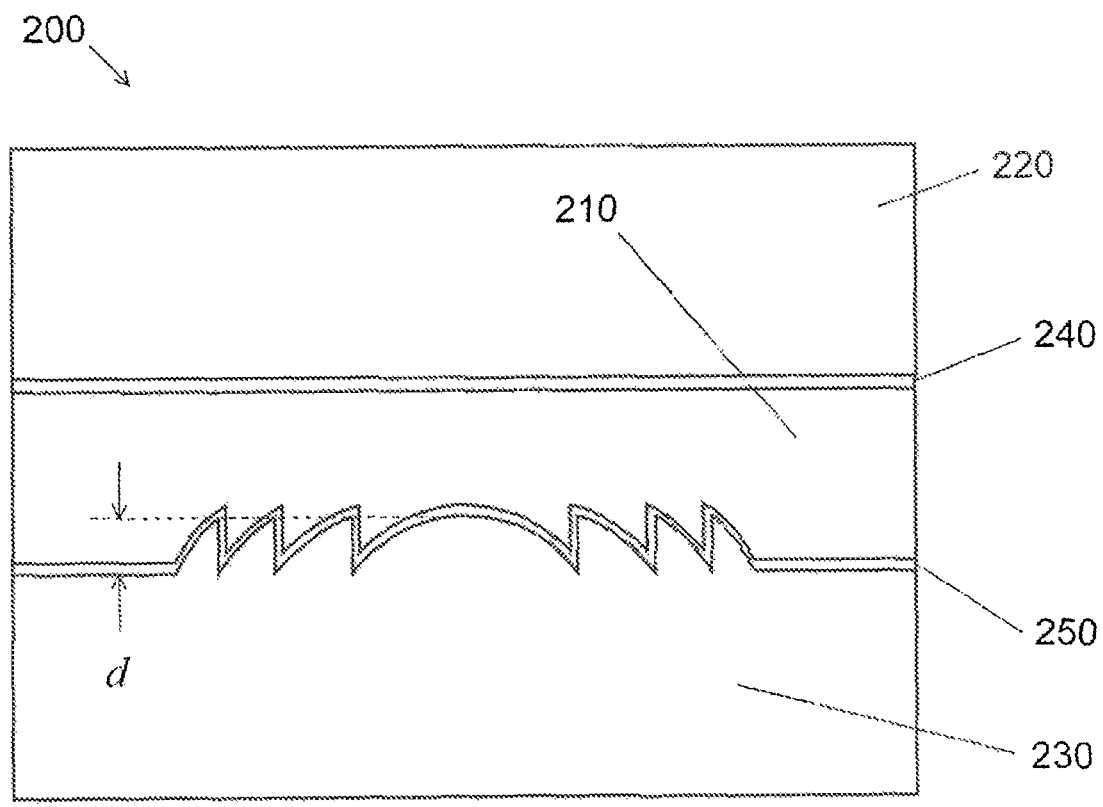
FIG. 3 shows an embodiment of the present invention in which an electro-active element includes a cholesteric liquid crystalline material located in between a first substrate with a mostly smooth surface and a second substrate with a patterned surface topography.

FIG. 3 shows an embodiment in which an electro-active element 200 includes a cholesteric liquid crystalline material 210 located between a first substrate 220 with a mostly smooth surface and a second substrate 230 with a patterned surface topography. The surfaces of the two substrates facing the cholesteric liquid crystalline material are each coated with a single optically transparent electrode 240 and 250. The patterned surface of the second substrate is a surface-relief optic having a pre-determined depth d. The patterned surface can be either refractive (a surface relief refractive optic) or diffractive (a surface relief diffractive optic), but is preferred to be diffractive. The surface relief optic can be fabricated in a multitude of geometries but, in FIG. 3, is shown as a surface relief diffractive optic having an add power suitable for correcting presbyopia—namely, between +0.00 D and +3.00 D or higher.

When a first voltage below a first predetermined threshold is applied to the electro-active element, the element can be in a deactivated state in which it provides substantially no optical power. In other words, when voltage below the first predetermined threshold is applied (or when substantially no voltage is supplied), the cholesteric liquid crystalline material can have an index of refraction ($n_{avg}$) that is substantially the same as the refractive index of the substrates ($n_{sub}$). In this case, the refractive index of the electro-active element is substantially constant over its thickness and there is no change in the optical power. When sufficient voltage is applied to align the directors of the cholesteric liquid crystalline material parallel to the resulting electric field (the voltage is above a second predetermined threshold), the electro-active element can be in an activated state in which it provides optical add power. In other words, when voltage above the second predetermined threshold is applied, the cholesteric liquid crystalline material can have an index of refraction ($n_o$) that is different than the index of refraction of the substrates. This refractive index difference (the difference between $n_o$ and $n_{sub}$) results in an optical phase delay which is generated over the thickness of the liquid crystal. This phase delay is equal to $d(n_{sub}-n_o)$. For maximum diffraction efficiency (i.e., the fraction of incident light that will be brought to focus using the diffractive element), it is necessary that all incident light of a wavelength λ interfere constructively at the focal point, where λ is the wavelength of light for which the electro-active element is designed to focus. For this to happen, the light being focused at the focal point needs to be in phase. When the phase retardation over each diffractive zone is an integer multiple of the full wavelength (λ), all the light will be in phase at the focal point and the electro-active element will have high diffraction efficiency. Thus, if $d(n_{sub}-n_o)=\lambda$, incident light of wavelength λ will be focused with high diffraction efficiency.

In embodiments of the present invention in which the electro-active element produces optical power through refraction (e.g., a surface relief refractive optic is used), first the desired optical power in the activated state is determined. Then, a radius of curvature, R, is selected to satisfy the equation $R=(n_{sub}-n_o)/$(desired optical power). A refractive optic in optical communication with a birefringent material has different indices of refraction for orthogonal polarization components of light. This results in two different focal lengths, where one of the focal lengths is the designed focal length and the other focal length is an undesired focal length. Focusing efficiency for a refractive optic can be determined as the fraction of incident light refracted to the desired focal length.

Choosing Materials Based on Dispersion Similarities

Cholesteric liquid crystalline materials are either intrinsically cholesteric (i.e., chiral or twisted), or are formed by mixing a nematic liquid crystal with a chiral twisting agent. When the latter approach is employed, the resultant cholesteric liquid crystal has many of the same properties as the nematic liquid crystal from which it is formed. For example, the resultant cholesteric liquid crystalline material will have the same dispersion of an index of refraction. The resultant cholesteric liquid crystalline material also has the same ordinary and extra-ordinary indices of refraction as the nematic liquid crystal from which it is formed (though because it is now cholesteric, the effective change in index of refraction is between $n_o$ and $n_{avg}$). In some embodiments, the latter approach is preferred since many more nematic materials are available from commercial sources than cholesteric liquid crystals—and thus, the latter approach provides more design flexibility.

Choice of a nematic liquid crystal is governed by three primary requirements. It is well known that the switching time of a liquid crystal is at least quadratic with thickness. Therefore, the first requirement, is that the liquid crystal satisfies the above condition for high diffraction efficiency, $d(n_{sub}-n_o)=\lambda$, for the smallest possible value of d (Likewise, in the case of a refractive, dynamic electro-active optic, it will be required to use the largest possible radius of curvature, R, for the refractive surface to minimize the thickness at either the center or edge of the layer of liquid crystal). This demands a liquid crystal with as large a birefringence ($\Delta n = n_e - n_o$) as possible. Cholesteric liquid crystals have a reduced dynamic range with respect to their refractive indices as compared with nematic liquid crystals ($n_{avg}-n_o < n_e-n_o$). This property necessarily requires larger values of d to satisfy the condition of high diffraction efficiency. Thus, the second requirement is that the nematic liquid crystal has as large a biefringence as possible. The third requirement is that in the deactivated state the liquid crystal has a dispersion of an index of refraction (refractive index as a function of wavelength, λ) that matches a dispersion of an index of refraction of the substrates as closely as possible. Thus, the dispersion of $n_{avg}$ should match as closely as possible the dispersion of $n_{sub}$. If this is not the case, in the deactivated state, $n_{avg}$ will not be substantially equal to $n_{sub}$ over a broad range of wavelengths and there will be some unwanted focusing.

In embodiments of the present invention, the commercial nematic liquid crystal BL037 (manufactured by Merck) can be used as it has a very large birefringence ($n_e$=1.8080, $n_o$=1.5260, $\Delta n$=0.2820). Alternatively, the nematic liquid crystals BL036, BL038, BL087, BL093, BL111, TL213, TL216, E7, E63, MLC-6621-000, MLC-6621-100, ZLI-5049-000, and ZLI-5049-100, all of which are manufactured by Merck can be used. However, it should be understood that it is not possible to list all nematic liquid crystals usable in embodiments of the present invention. Therefore, in embodiments of the present invention, any nematic liquid crystal having a birefringence, $\Delta n$, larger than approximately 0.20 can be used.

To this nematic liquid crystal a chiral twisting agent is added to make it a cholesteric liquid crystalline material. Chiral dopants are qualified by the handedness they induce in the nematic liquid crystal (left or right) and by the twist strength which is quantified by the helical twisting power. The helical twisting power is defined as 100/(P*C), where P is the twist pitch (measured in microns over which the liquid crystal rotates by a full 360 degrees) induced by the chiral dopant and C is the chiral dopant's weight percentage in the mixture. It should be noted that the twist pitch is denoted as negative if it is left-handed and as positive if right-handed. Chiral agents are also available from Merck and include materials for inducing right-handed twist (CB15, ZLI-3786, ZLI-4572, MLC-6248) and left-handed twist (C15, ZLI-811, ZLI-4571, MLC-6247). Table I shows typical values of helical twisting power for the aforementioned liquid crystals. However, the values shown depend upon both the particular chiral dopant employed and the nematic liquid crystal it is mixed with and are thus typical values. It should be understood that it is not possible to list all chiral dopants usable in embodiments of the present invention. Therefore, in some embodiments, any chiral dopant having a helical twisting power with a magnitude (absolute value) greater than approximately 1.1 can be used. Alternatively, any chiral dopant having a helical twisting power with a magnitude (absolute value) greater than approximately 1.8 can be used. Alternatively, any chiral dopant having a helical twisting power with a magnitude (absolute value) greater than approximately 5.9 can be used. Alternatively, any chiral dopant having a helical twisting power with a magnitude (absolute value) greater than approximately 8.1 can be used.

TABLE 1

| Chiral Dopant | Helical Twisting Power (per micron) |
|---|---|
| C15 | −1.1 to −1.8 |
| CB15 | +5.9 to +9.4 |
| ZLI-811 | −8.1 to −14.5 |
| ZLI-3786 | +8.1 to +14.5 |
| ZLI-4571 | −27.6 to −39.5 |
| ZLI-4572 | +27.6 to +39.5 |
| MLC-6247 | −8.1 to −14.5 |
| MLC-6248 | +8.1 to +14.5 |

The material ZLI-4571 can be dissolved into BL037 at increasing concentrations to induce decreasing values of the twist pitch, p, of the cholesteric liquid crystalline material. It should be noted that any of the aforementioned chiral agents can be used, but chiral agent ZLI-4571 can be preferred for some embodiments as it induces smaller values of p at lower concentrations than the other materials.

Figure 4:
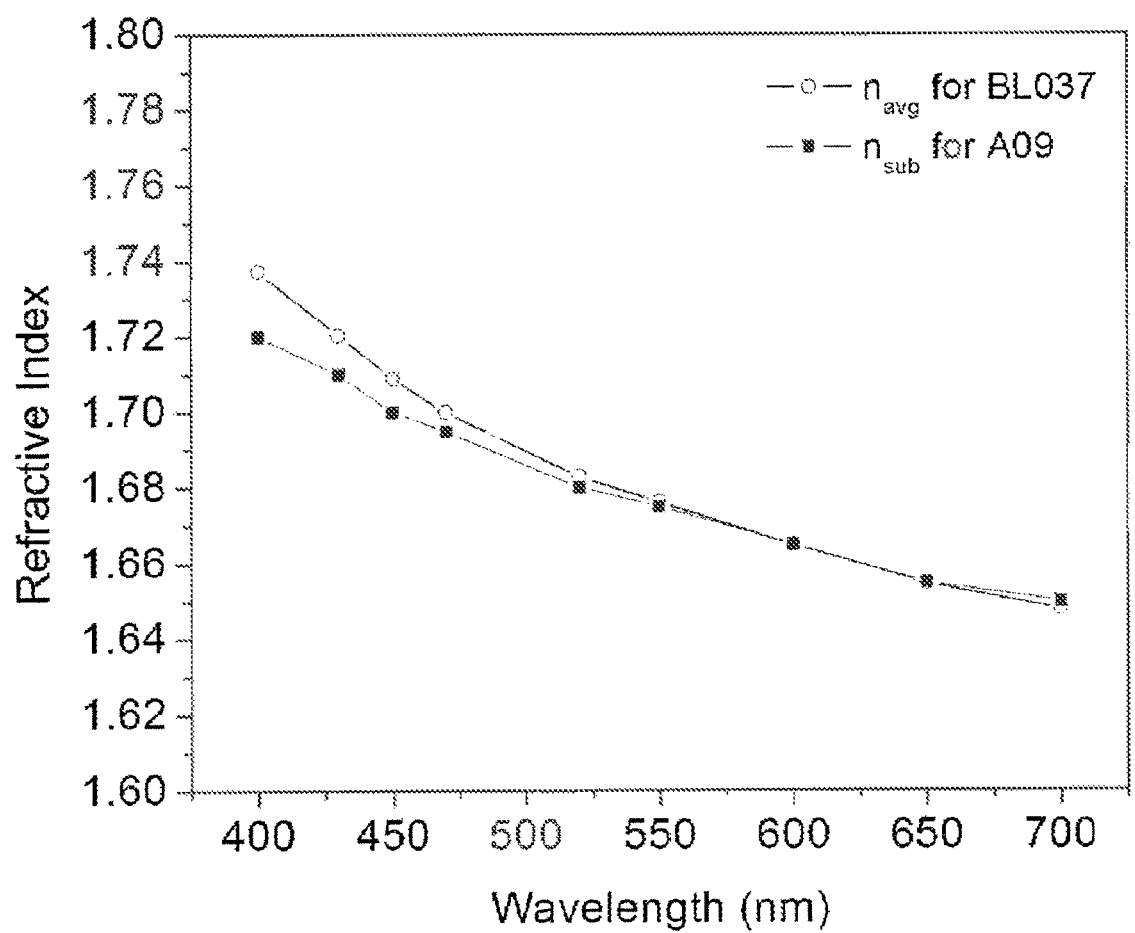
FIG. 4 shows the dispersion of an average index of refraction ($n_{avg}$) of nematic liquid crystal BL037 and substrate material A09 over the visible spectrum.

Once the cholesteric liquid crystalline material is chosen, the selection of the substrate material is dictated by the value of $n_{avg}$. For the nematic liquid crystal BL037, $n_{avg}$=1.6670. Optical materials having a refractive index that closely match this value include: A09 ($n_{sub}$=1.66, manufactured by Brewer Science), MR-10 ($n_{sub}$=1.67, manufactured by Mitsui), and Radel R-5000 NT ($n_{sub}$=1.675, manufactured by Solvay). The material A09 from Brewer science is a preferred selection as its value of $n_{sub}$ is a close match to the value of $n_{avg}$ for BL037 over a broad range of wavelengths, i.e. the dispersion of an index of refraction of the two materials is similar. FIG. 4 shows the dispersion of the average index of refraction ($n_{avg}$) of BL037 and A09 over the visible spectrum.

With the cholesteric liquid crystalline material and the substrate material chosen, the depth of the surface relief optic structures (or zone height, d) of the cholesteric liquid crystalline material must be selected. Since $n_{sub}$ and $n_o$ are now known, the zone height is chosen to satisfy the condition for high diffraction efficiency, $d(n_{sub}-n_o)=\lambda$, at, the intended wavelength of operation, $\lambda$. The intended wavelength of operation is usually 550 nm, which is the wavelength of the maximum human photopic, response. This step determines the activated state diffraction efficiency of the electro-active element, which should be as large as possible (preferably greater than 90%) to ensure clear vision. It should be noted that a higher diffraction efficiency can be achievable with a slightly different zone height than would be indicated by the equation $d(n_{sub}-n_o)=\lambda$. This higher diffraction efficiency can be determined experimentally by evaluating zone heights within 10% of the value determined by the aforementioned equation. By way of example only, if a surface relief diffractive optic is fabricated from the material A09 and a cholesteric liquid crystalline material made from BL037, the ideal zone height is approximately 4.0 μm.

The twist pitch of the cholesteric liquid crystalline material determines the residual deactivated state diffraction efficiency (i.e., residual focusing in the deactivated state). This value should be as low as possible, for example, less than approximately 10%, but preferably, less than approximately 5%. The diffraction efficiency or focusing efficiency of the electro-active element in the activated state and in the deactivated state is determined experimentally. The amount of chiral agent required to achieve a given twist pitch is readily determined experimentally by generating different mixtures of nematic liquid crystal with known concentrations of the chiral agent. Determining the twist pitch of a cholesteric can be accomplished by using wedged cells. The use of wedged cells is a technique well known in the art in which a layer of cholesteric liquid crystal is sandwiched between two non-parallel substrates coated with an alignment layer where the angle and distance between the substrates is known. In a wedged cell, cholesteric liquid crystal will exhibit domain discontinuities as the thickness of the cell changes. The distance between the discontinuities corresponds to the distance over which the thickness of the cell changes by a ¼ of the twist pitch of the cholesteric liquid crystal. With a measurement of the distance between the discontinuities and the known angle between the two substrates, it is a simple matter of trigonometry to determine the twist pitch of the cholesteric liquid crystal.

Diffraction efficiency is the fraction of incident light that appears in a particular diffractive order. For an electro-active element according to some embodiments, the diffraction efficiency is the fraction of the incident light brought to focus at the designed focal length. Measuring diffraction efficiency is accomplished by passing light through the diffractive element, measuring the amount of power (in Watts, using an opto-electronic optical power meter) in each diffractive order, summing the power over all diffractive orders, and then dividing the power in the diffractive order corresponding to the designed focal length by the total power. As this measurement is conducted down-stream from the element, all transmission losses will be accounted for. This is a particularly useful method as it can be done as function of lens area, position, and wavelength; thus allowing a detailed characterization of the diffractive optic. Diffraction efficiency should generally be as high as possible (greater than 90%) in the activated state and as low as possible (less than 10%, and preferably less than 5%) in the deactivated state.

In a refractive electro-active element, index differences between orthogonal polarization components will result in two slightly different focal lengths, where one corresponds to the designed focal length and the other corresponds to an undesired focal length. In such an instance one can define a focusing efficiency, defined as the fraction of incident light refracted into the designed focal length. Measuring focusing efficiency is accomplished by passing light through the refractive element, measuring the power (in Watts, using an opto-electronic optical power meter) in each focal length individually, and then dividing the power in the designed focal length by the total power. The power can be measured in, each focal length individually by using polarizers to block light from the other focal length. Focusing efficiency should generally be as, high as possible (greater than 90%) in the activated state and as low as possible (less than 10%, and preferably less than 5%) in the deactivated state.

As mentioned above, the cholesteric liquid crystalline material can be produced from a nematic liquid crystal and a chiral doping agent. The mass of a given amount of nematic liquid crystal is measured and the appropriate mass of chiral dopant is determined based on the mass of liquid crystal and the desired percentage by weight of the chiral dopant. In other words, if 6% of the chiral agent is desired, 94 grams of nematic liquid crystal can be combined with 6 grams of the chiral doping agent. The desired mass, of chiral dopant can be added to the liquid crystal and mixed physically by a mixing machine or by adding a magnetic stir bar and placing the mixture on a magnetic stir plate.

Figure 5:
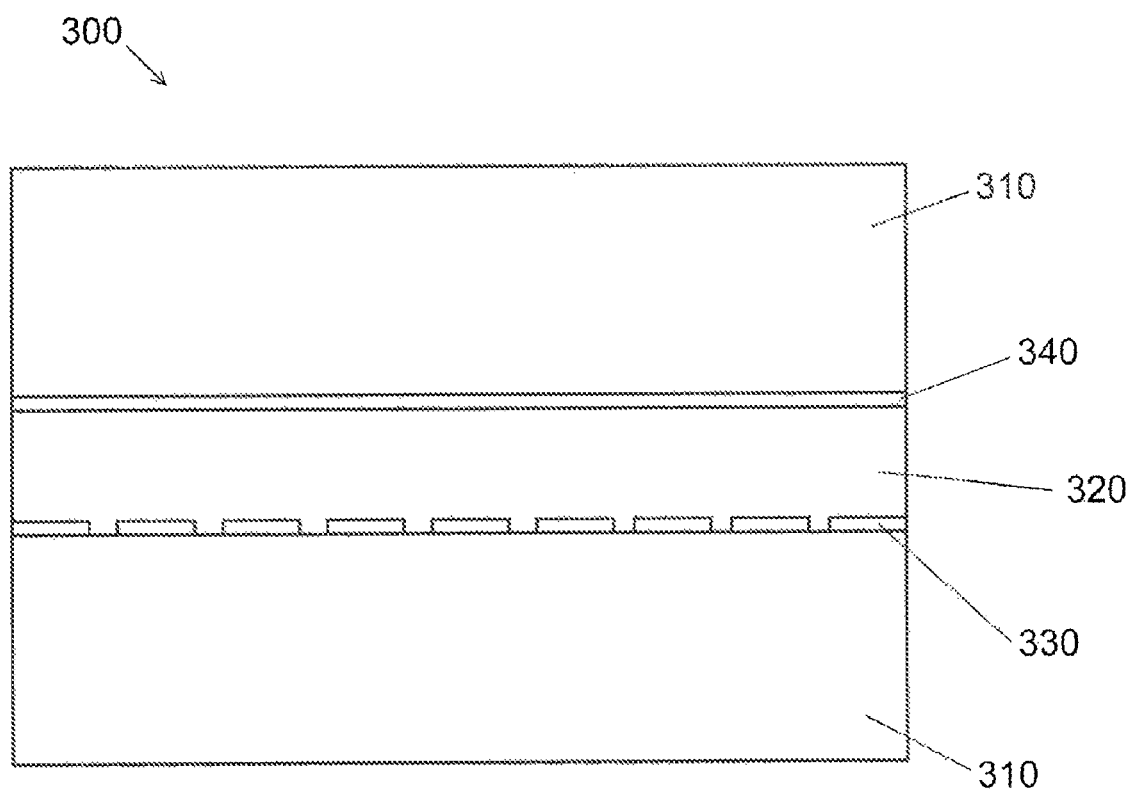
FIG. 5 shows an embodiment of an electro-active element including two substrates disposed such that there is a substantially constant thickness between them—the first substrate has a single continuous electrode disposed thereon and the second substrate has a plurality of electrodes disposed thereon.

In some embodiments, as shown in FIG. 5, an electro-active element 300 includes two substrates 310 which are disposed such that there is a substantially constant thickness between them. A cholesteric liquid crystalline material 320 can be disposed between the substrates. It should be noted that no surface-relief optic is included in such an embodiment. In the absence of a surface-relief optic, patterned or pixilated electrodes 330 are used in conjunction with another single electrode 340. A plurality of voltages of different amplitudes can be applied to the patterned or pixilated electrodes. These electrodes can be arranged in a manner such that when voltages are applied to the electrodes, the resulting polarization-insensitive refractive index profile in the layer of cholesteric liquid crystalline material acts to focus light in a diffractive or refractive manner.

Patterned Electrodes are electrodes utilized in an electro-active element such that with the application of appropriate voltages to the electrodes, the optical power created by the liquid crystal is created diffractively regardless of the size, shape, and arrangement of the electrodes. For example, a diffractive optical effect can be dynamically produced within the liquid crystal by using concentric ring shaped electrodes. Pixilated Electrodes are electrodes utilized in an electro-active element that are individually addressable regardless of the size, shape, and arrangement of the electrodes. Furthermore, because the electrodes are individually addressable, any arbitrary pattern of voltages can be applied to the electrodes. For example, pixilated electrodes can be squares or rectangles arranged in a Cartesian array or hexagons arranged in a hexagonal array. Pixilated electrodes need not be regular shapes that fit to a grid. For example, pixilated electrodes can be concentric rings if every ring is individually addressable. Concentric pixilated electrodes can be individually addressed to create a diffractive optical effect.

In some embodiments, an electro-active element can be implanted (by either molding or casting, for example) within a refractive spectacle lens or an optical substrate to form an electro-active lens. The spectacle lens or the optical substrate can have substantially the same refractive index as the electro-active element's substrates to ensure that the edges of the electro-active element are invisible in the finished electro-active lens. In some embodiments in which the electro-active element substrates are manufactured from A09 ($n_{sub}$=1.66, manufactured by Brewer Science), the commercially available ophthalmic lens resin MR-10 (n=1.67, manufactured by Mitsui) would be an appropriate selection. Alternatively, other materials can be used. If desired, the dispersion of an index of refraction of the refractive spectacle lens or optical substrate can be matched to the dispersion of an index of refraction of the electro-active element's substrates.

In some embodiments, the electro-active element can be miniaturized and utilized within an electro-active contact lens, an electro-active corneal in-lay, an electro-active corneal on-lay, or an electro-active intra-ocular lens. The electro-active element can also be combined with a Progressive Addition Lens or any other multifocal lens such as a bifocal or trifocal. The electro-active element can also be combined with a single-vision lens.

Some embodiments have shown selecting materials for a diffractive electro-active element and selecting the properties of these materials in the following order: 1) Select a nematic liquid crystal having a high birefringence. 2) Select a chiral twisting agent based on the concentration required to induce a smaller value of p. 3) Select an electro-active substrate material having an index of refraction ($n_{sub}$) that matches the average index of refraction ($n_{avg}$) of the nematic liquid crystal over a broad range of wavelengths (i.e., the dispersion of an index of refraction of the two materials is substantially equal). 4) Select an operative wavelength, $\lambda$. 5) Select a zone height, d, based on satisfying $d(n_{sub}-n_o)=\lambda$. 6) Determine experimentally the percentage by weight of chiral doping agent to add to the nematic liquid crystal to achieve the desired p which produces low diffraction efficiency in the deactivated state and low operating voltage.

Some embodiments have shown selecting materials for a refractive electro-active element and selecting the properties of these materials in the following order: 1) Select a nematic liquid crystal having a high birefringence. 2) Select a chiral twisting agent based on the concentration required to induce a smaller value of p. 3) Select an electro-active substrate material having an index of refraction ($n_{sub}$) that matches the average index of refraction ($n_{avg}$) of the nematic liquid crystal over a broad range of wavelengths (i.e., the dispersion of an index of refraction of the two materials is substantially equal). 4) Select an operative wavelength, $\lambda$. 5) Select a radius of curvature, R, based on satisfying $R=(n_{sub}-n_o)/$(desired optical power). 6) Determine experimentally the percentage by weight of chiral doping agent to add to the nematic liquid crystal to achieve the desired p which produces low focusing efficiency in the deactivated state and low operating voltage.

It is to be understood, that these steps can be performed out of order. For example, a nematic liquid crystal is selected before the substrate because many more substrate materials are commercially available. Thus, it is easier to find a substrate material with index of refraction and dispersion of the index of refraction properties that match a given nematic liquid crystal than it is to find a nematic liquid crystal with index of refraction and dispersion of the index of refraction properties that match a given substrate material. However, if desired, the substrate material can be selected before the nematic liquid crystal.

Choosing Materials Based on Crossover Wavelength

In some embodiments, the materials for the substrate and the liquid crystal do not have similar refractive index dispersions and the materials can be chosen based on the crossover wavelength. As used herein, the crossover wavelength is the wavelength where the $n_{sub}$ of the substrate and the $n_{avg}$ of the liquid crystal are equal. The $n_{avg}$ of the liquid crystal is the refractive index of the liquid crystal in the deactivated state. In some embodiments, the methods described above and in U.S. Pat. No. 7,728,949, which is hereby incorporated by reference in its entirety, for selecting optical materials for producing electro-active optics for dynamic spectacle lenses capable of fail-safe operation can result in a crossover wavelength of 550 nm. In some embodiments, the $n_{sub}$ of the substrate and the $n_{avg}$ of the liquid crystal can be 1.66±0.03 at a crossover wavelength of 550 nm. In some embodiments, a refractive index of 1.66±0.03 at a wavelength of 550 nm is high for optical materials suitable for ophthalmic lenses and the differences in the dispersions of the refractive indices as a function of wavelength can be significant and variable from material to material.

Figure 6:
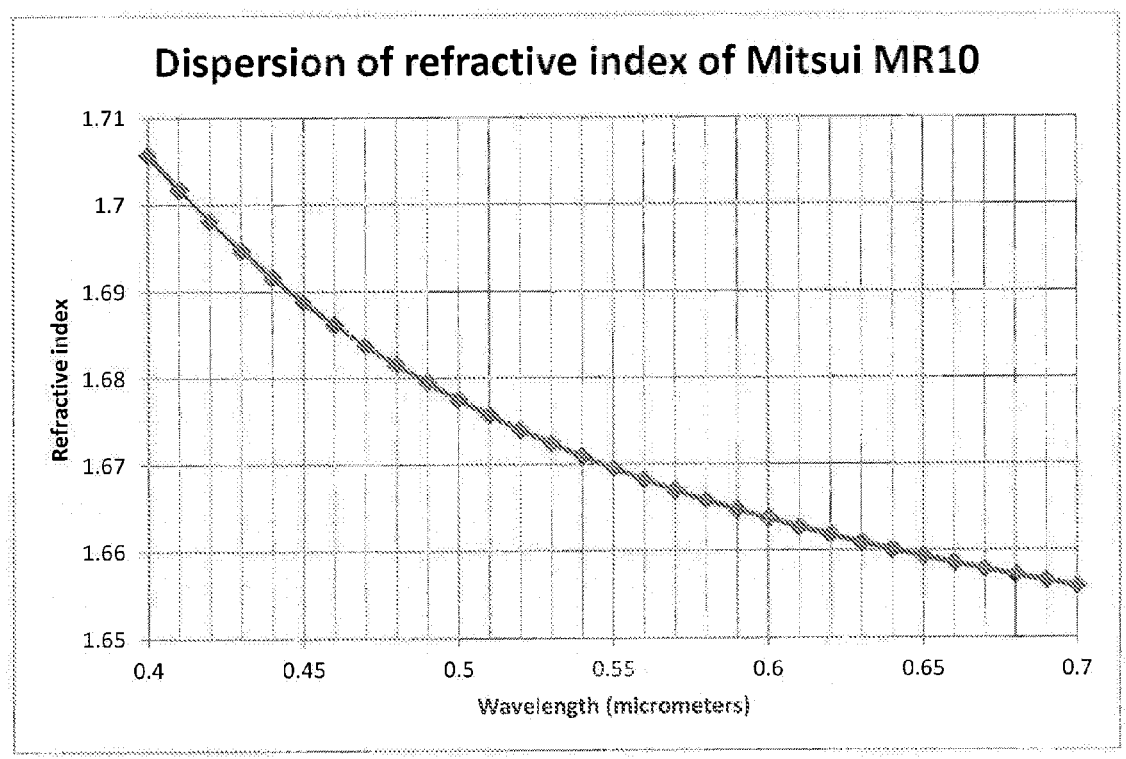
FIG. 6 shows the dispersion of the refractive index of a substrate made from MR-10 as a function of wavelength.
Figure 7:
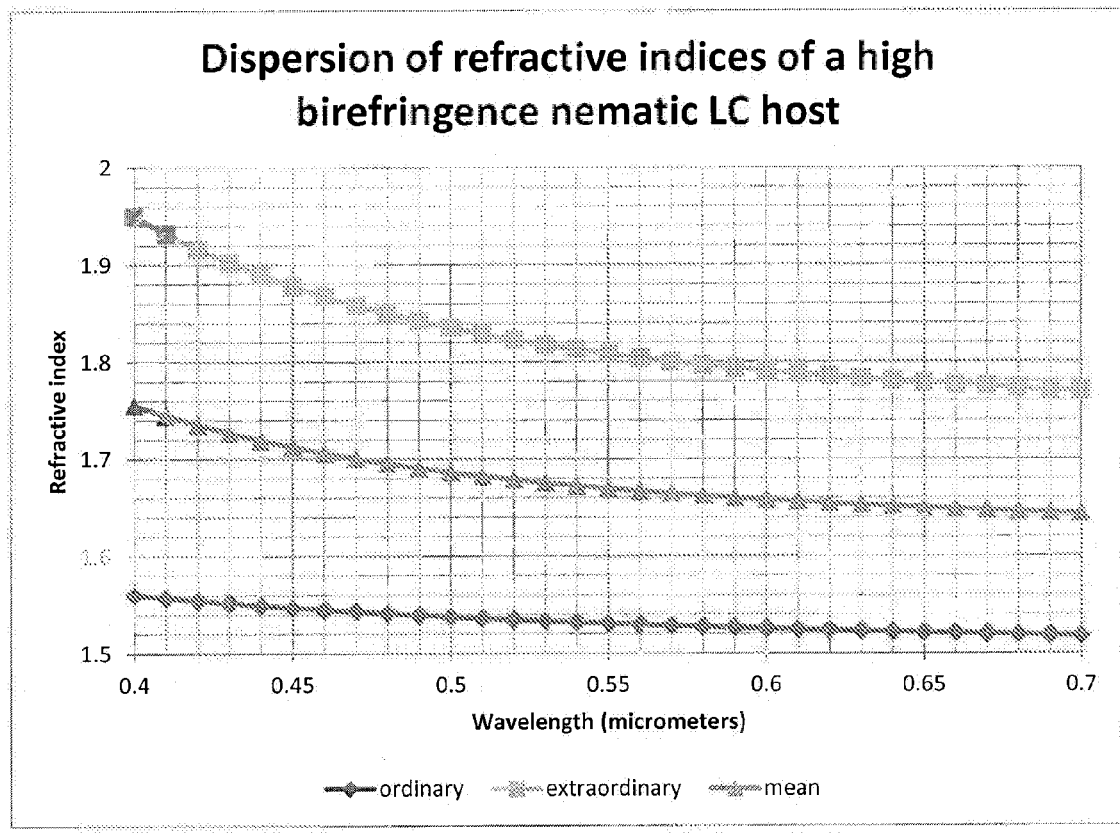
FIG. 7 shows the dispersion of the refractive indices of a high birefringence nematic liquid crystal host as a function of wavelength.

By way of example, FIG. 6 shows the dispersion of the wavelength dependent refractive index of the substrate material MR-10 (manufactured by Mitsui). As can be seen in FIG. 6, the dispersion of the refractive index is approximately 0.05 from a wavelength of 400 nm to 700 nm. The $n_{sub}$ is approximately 1.67 at a wavelength of 550 nm. FIG. 7 shows the dispersion of the ordinary, extraordinary, and average (or mean) refractive indices of a liquid crystal having a high birefringence nematic host and having a $n_{avg}$ of approximately 1.67 at a wavelength of 550 nm. The terms mean refractive index and average refractive index are used interchangeably. As can be seen in FIG. 7, the dispersion of the $n_{avg}$ is approximately 0.12 from a wavelength of 400 nm to 700 nm. When, as shown, in FIG. 8, the dispersion of the refractive index of MR-10 is overlapped with the dispersion of the average refractive index of the liquid crystal, it can be seen that the indices have a matching refractive index of approximately 1.67 at a wavelength of 550 nm (the peak of human photopic vision occurs at 550 nm). Thus, the crossover wavelength is 550 nm.

Figure 8:
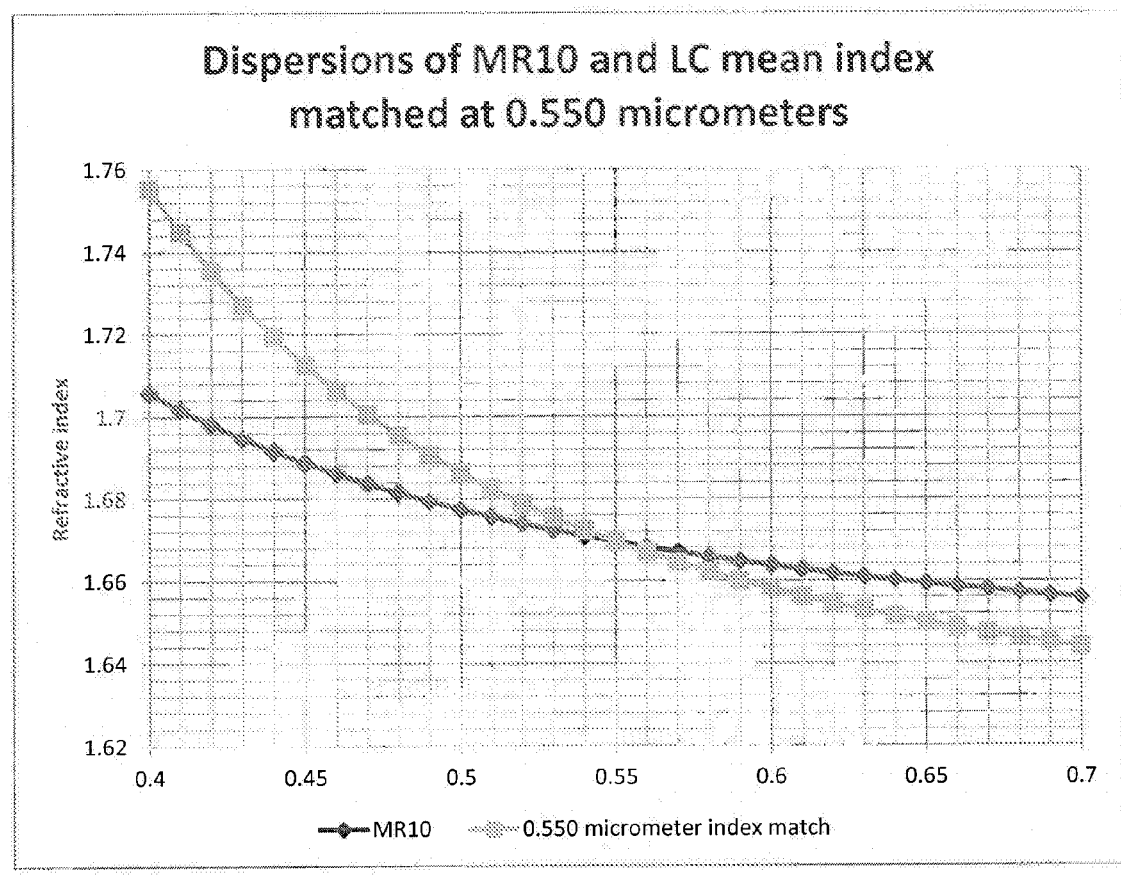
FIG. 8 shows an overlap of the dispersions shown in FIGS. 6 and 7.

As can be seen in FIGS. 6-8, the dispersion of the MR-10 substrate's refractive index (approximately 0.05) and the dispersion of the hypothetical liquid crystal's average refractive index (approximately 0.12) vary greatly, which can impact the functioning of an electro-active lens fabricated from these materials. For example, when an electro-active lens is fabricated using MR-10 diffractive substrates and a polarization insensitive cholesteric liquid crystal formulated from a nematic liquid crystal host having a $n_{avg}$ similar to that shown in FIG. 7, the deactivated state of the lens can have a ghost image. In some embodiments, the deactivated state diffraction efficiency of the first diffractive order (the design focal length) can be high in the blue region of the visible spectrum (450 nm to 495 nm), which causes a ghost image. The ghost image can be distracting to the wearer of the lenses and can cause a drop in visual acuity. In some embodiments, the diffraction efficiency of all diffractive orders other than the $0^{th}$ order are zero in the deactivated state to avoid or minimize the occurrence of ghost images.

In some embodiments, a device having an electro-active lens, for example the electro-active lens of FIG. 3, can be constructed to avoid or minimize ghost images based on the selection of the materials. As discussed above, the electro-active lens can have an activated state and a deactivated state.

The electro-active lens can have a substrate with a diffractive relief surface, such as substrate 230 in FIG. 3. In some embodiments, the substrate can be made from a material having a refractive index at a wavelength of 550 nm of 1.64 or greater, 1.65 or greater, 1.66 or greater, 1.67 or greater, 1.68 or greater, 1.69 or greater, 1.7 or greater, or in a range from 1.64 to 1.7. In some embodiments, the substrate can have a refractive index that is a first function of wavelength. Examples of such substrates are provided above and include, for example, MR-10, which is available from Mitsui.

The electro-active lens can also have an electro-active material in optical communication with the substrate. The electro-active material can be a liquid crystal, such as liquid crystal 210 in FIG. 3. The liquid crystal can have a nematic liquid crystal host as described above. In some embodiments, in the deactivated state of the electro-active lens, the nematic liquid crystal host can have an average refractive index ($n_{avg}$) at a wavelength of 550 nm of 1.62 or greater, 1.63 or greater, 1.64 or greater, 1.65 or greater, 1.66 or greater, 1.67 or greater, 1.68 or, greater, or in a range of 1.62 to 1.68. An example of such a nematic liquid crystal host includes, for example, MDA-98-1602, which is available from Merck. In some embodiments, the nematic liquid crystal host can have an average refractive index that is a second function of wavelength. In some embodiments, nematic liquid crystal host's average refractive index has a different function of wavelength than the substrate's refractive index. In some embodiments, the liquid crystal can be a cholesteric liquid crystal material having a nematic liquid crystal host as described above. The cholesteric liquid crystal material can be a polarization insensitive cholesteric liquid crystal material.

In some embodiments, when the crossover wavelength is less than 550 nm, and preferably in the blue light region (450 nm to 495 nm), the first order diffraction efficiency in the deactivated state is reduced, thereby reducing the impact of ghost images on a wearer's visual acuity. In some embodiments, the crossover wavelength can be less than 550 nm, 545 nm or less, 540 nm or less, 535 nm or less, 530 nm or less, 525 nm or less, 520 nm or less, 515 nm or less, 510 nm or less, 505 nm or less, 500 nm or less, 495 nm or less, 490 nm or less, 485 nm or less, 480 nm or less, 475 nm or less, 470 nm or less, 465 nm or less, 460 nm or less, 455 nm or less, 450 nm or less, or in a range from 450 nm to less than 550 nm.

Figure 9:
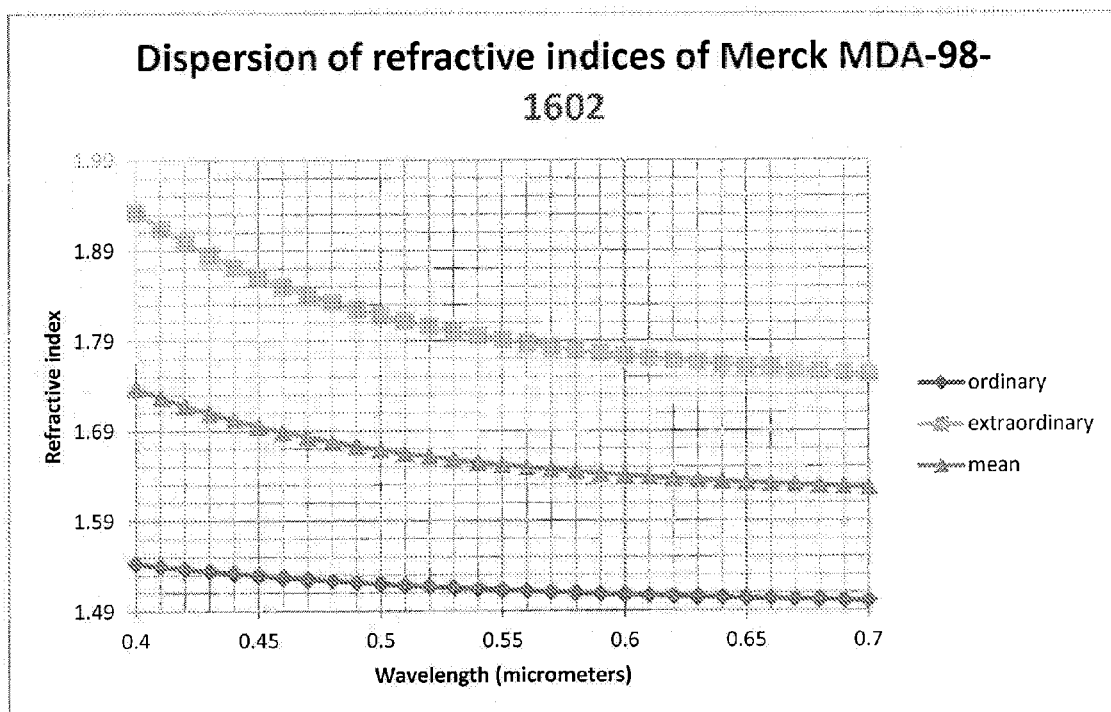
FIG. 9 shows the dispersion of the refractive indices of the liquid crystal MDA-98-1602 as a function of wavelength.
Figure 10:
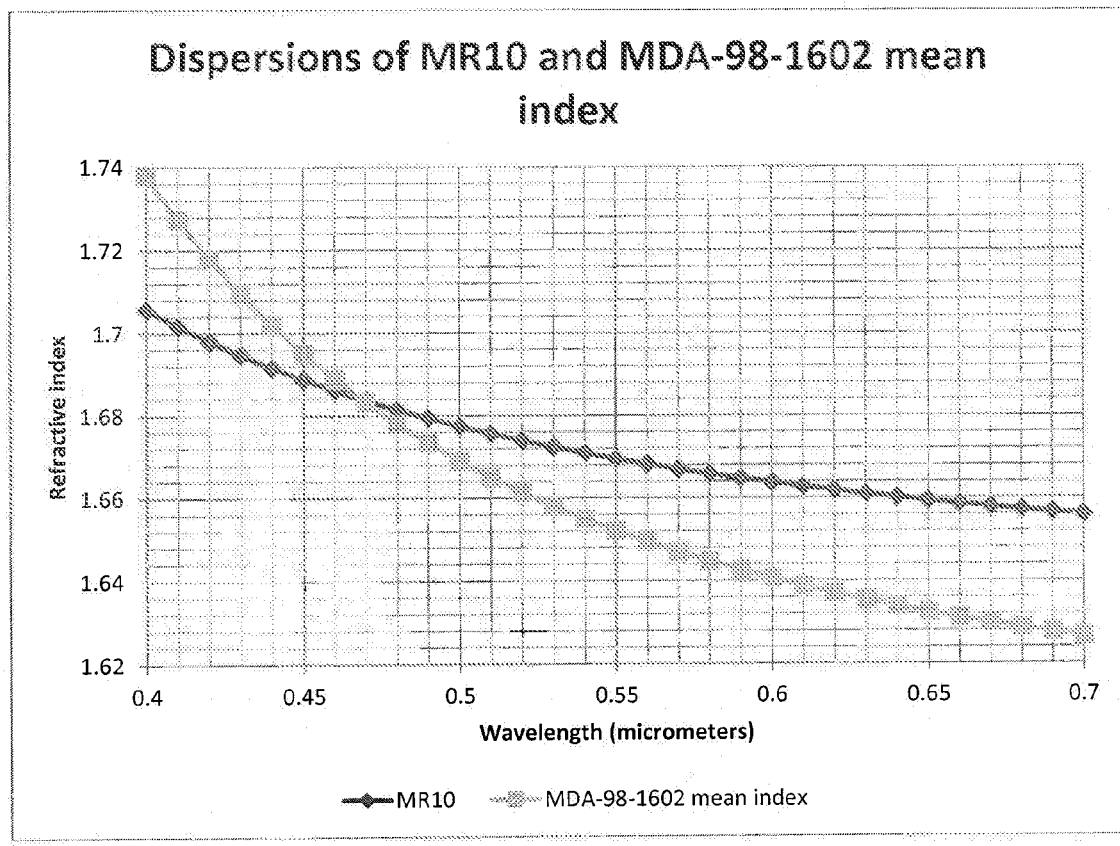
FIG. 10 shows an overlap of the dispersions shown in FIGS. 6 and 9.

FIGS. 6, 9, and 10, show an exemplary liquid crystal (MDA-98-1602) and substrate (MR-10) pairing that has a crossover wavelength in the blue region. FIG. 9 shows the dispersion of the ordinary, extraordinary, and average refractive indices of the high birefringence nematic liquid crystal host MDA-98-1602 (available from Merck). The dispersion of the substrate MR-10 is shown in FIG. 6. FIG. 10 shows the dispersion of the refractive index of MR-10 overlapped with dispersion of the average refractive index of the liquid crystal. The crossover wavelength occurs at approximately 470 nm.

Thus, electro-active lenses fabricated using MR-10 diffractive substrates and a polarization insensitive cholesteric liquid crystal formulated from the MDA-98-1602 nematic host exhibits lower first order deactivated state diffraction efficiency in the blue region, thereby reducing the impact of ghost images on a wearer's visual acuity.

Figure 11:
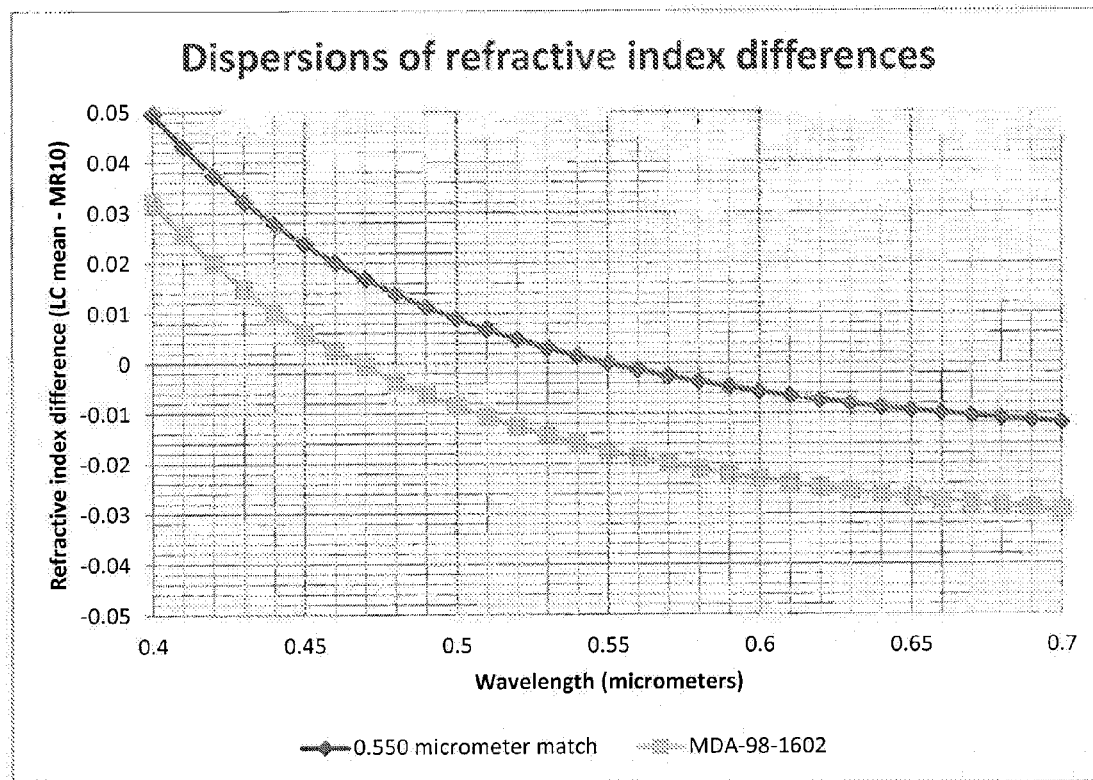
FIG. 11 shows the refractive index difference ($n_{avg}-n_{sub}$) for the combination of MR-10 and MDA-98-1602 having a crossover wavelength of 470 nm as shown in FIG. 10 and the combination of MR-10 and the liquid crystal of FIG. 7 having a crossover wavelength of 550 nm as shown in FIG. 8.

In some embodiments, choosing materials that have a crossover wavelength less than 500 nm can reduce the maximum refractive index difference between the substrate and the liquid crystal across the wavelength range from 400 nm to 700 nm. For example, FIG. 11 shows the refractive index difference ($n_{avg}-n_{sub}$) for the combination of MR-10 and MDA-98-1602 having a crossover wavelength of 470 nm as shown in FIG. 10 and the combination of MR-10 and the hypothetical liquid crystal of FIG. 7 having a crossover wavelength of 550 nm as shown in FIG. 8.

In some embodiments, the $n_{avg}$ can be greater than the $n_{sub}$ at wavelengths less than the crossover wavelength, the $n_{avg}$ can be less than the $n_{sub}$ at wavelengths greater than the crossover wavelength, or the $n_{avg}$ can be greater than the $n_{sub}$ at wavelengths less than the crossover wavelength and the $n_{avg}$ can be less than the $n_{sub}$ at wavelengths greater than the crossover wavelength. For example, FIG. 10 shows that the $n_{avg}$ is greater than the $n_{sub}$ at wavelengths less than the crossover wavelength and the $n_{avg}$ is less than the $n_{sub}$ at wavelengths greater than the crossover wavelength.

In some embodiments, the first order diffraction efficiency of the electro-active lens in the activated state at the crossover wavelength can be greater than approximately 90% at preferably greater than approximately 95%, to ensure clear vision. In some embodiments, the first order diffraction efficiency of the electro-active lens in the deactivated state at the crossover wavelength can be as low as possible, for example, less than approximately 10%, but preferably, less than approximately 5%.

In some embodiments, in addition to the crossover wavelength being within the ranges listed above, the substrate material can have a higher Abbe number than the nematic liquid crystal host. The Abbe number is a measure of a material's dispersion (i.e., variation of refractive index with wavelength) in relation to refractive index. A high Abbe number indicates that the material has a low dispersion. Equation 1 below defines the Abbe number $V_D$:

$$V_D=(n_D-1)/(n_F-n_C) \quad (1)$$

where $n_D$, $n_F$, and $n_C$ are the refractive indices of the material at the wavelengths of the Fraunhofer D-, F-, and C-spectral lines (589.3 nm. 486.1, nm, and 656.3 nm respectively). For example, FIG. 10 shows that substrate MR-10 has a lower dispersion in a range from 400 nm to 700 nm (approximately 0.05) than nematic liquid crystal host MDA-98-1602 (approximately 0.114). Therefore, the substrate MR-10 has a higher Abbe number than nematic liquid crystal host MDA-98-1602.

In some embodiments, $n_{sub}$, $n_{avg}$, or both decrease over a wavelength range from 400 nm to 700 nm such that over the wavelength range from 400 nm to 700 nm $n_{sub}$ $n_{avg}$, or both are highest at 400 nm and lowest at 700. In some embodiments, materials for the substrate and the nematic liquid crystal host can be chosen based on the difference of the total dispersions of the average refractive index of the liquid crystal ($n_{avg}$) and the refractive index of the substrate ($n_{sub}$). In other words, the difference of the total dispersions of $n_{avg}$ and $n_{sub}$ is equal to the total dispersion of $n_{avg}$ minus the total dispersion of $n_{sub}$. The total dispersion of $n_{sub}$ is equal to $n_{sub}$ at 400 nm minus $n_{sub}$ at 700 nm. Similarly, the total dispersion of $n_{avg}$ is equal to $n_{avg}$ at 400 nm minus $n_{avg}$ at 700 nm. In some embodiments, the difference of the total dispersion of $n_{avg}$ and $n_{sub}$ is at least 0.04, at least 0.045, at least 0.05, at least 0.055, at least 0.06, at least 0.065, or at least 0.07.

In some embodiments, a device includes an electro-active lens having a substrate with a diffractive relief surface and an electro-active material in optical communication with the substrate. The electro-active lens can have an activated state and a deactivated state. The substrate can have a refractive index that is a first function of wavelength. The electro-active material can include a nematic liquid crystal host having a refractive index in the deactivated state that is a second function of wavelength different from the first function of wavelength. In some embodiments, the refractive index of the substrate and the refractive index of the electro-active material in the deactivated state are equal at a crossover wavelength in the blue light spectrum. In some embodiments, the substrate has a higher Abbe number than the nematic liquid crystal host and the crossover wavelength is less than 550 nanometers. In some embodiments, the refractive index of the substrate and the refractive index of the electro-active material in the deactivated state decrease from 400 nanometers to 700 nanometers. In some embodiments, a difference between a change in the refractive index of the electro-active material in the deactivated state from 400 nanometers to 700 nanometers and a change in the refractive index of the substrate from 400 nanometers to 700 nanometers is at least 0.05.

Some embodiments satisfy all four requirements listed above. Namely, the electro-active element is fail-safe as it provides substantially no optical power in the deactivated state because it has low diffraction efficiency or focusing efficiency in the deactivated state. Additionally, the electro-active element includes a cholesteric liquid crystalline material which is polarization insensitive and can thus focus all incident light. The electro-active lens only requires approximately 5 volts to operate in the activated state (in certain embodiments no more than between approximately 10 volts to approximately 15 volts are required, but in no case is more than 20 volts are required) and thus has low electrical power requirements (typically less than 1 milliwatt). Lastly, only two electrical connections are needed in some embodiments of the electro-active lens which have two continuous electrodes such as the embodiments shown in FIGS. 2a, 2b, and 3. Also, some embodiments have a crossover wavelength less than 550 nm, and preferably in the blue light spectrum.

It is to be appreciated that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A device comprising:
an electro-active lens comprising:
   (a) a substrate having a diffractive relief surface; and
   (b) an electro-active material n optical communication with the substrate,
   wherein:
      (i) the substrate has a refractive index that is a first function of wavelength,
      (ii) the electro-active material comprises a nematic liquid crystal host having an average refractive index that is a second function of wavelength different from the first function of wavelength,
      (iii) the electro-active lens has an activated state and a deactivated state,
      (iv) the refractive index and the average refractive index are equal at a crossover wavelength,
      (v) the crossover wavelength is in the blue light spectrum, and
      (vi) the electro-active lens has a first order diffraction efficiency in the deactivated state of less than 10% at the crossover wavelength and the electro-active lens has a first order diffraction efficiency in the activated state of greater than 90% at the crossover wavelength.

2. The device of claim 1, wherein the crossover wavelength is less than 495 nanometers.

3. The device of claim 1, wherein the crossover wavelength is less than 480 nanometers.

4. The device of claim 1, Wherein the device is a pair of spectacles.

5. The device of claim 1, wherein the electro-active material is a polarization insensitive cholesteric liquid crystal material comprising the nematic liquid crystal host.

6. The device of claim 1, wherein the substrate has a refractive index in a range from 1.64 to 1.7 at a wavelength of 550 nm.

7. The device of claim 1, wherein the nematic liquid crystal host has an average refractive index in a range from 1.62 to 1.68 at a wavelength of 550 nm.

8. A device comprising:
an electro-active lens comprising:
   (a) a substrate having a diffractive relief surface; and
   (b) an electro-active material in optical communication with the substrate,
   wherein:
      (i) the substrate has a refractive index that is a first function of wavelength,
      (ii) the electro-active material comprises a nematic liquid crystal host having an average refractive index that is a second function of wavelength different from the first function of wavelength,
      (iii) the electro-active lens has an activated state and a deactivated state,
      (iv) the refractive index and the average refractive index are equal at a crossover wavelength,
      (v) the crossover wavelength is in the blue light spectrum, and
      (vi) the average refractive index is greater than the refractive index at wavelengths less than the crossover wavelength and the average refractive index is less than the refractive index at wavelengths greater than the crossover wavelength.

9. The device of claim 8, wherein the crossover wavelength is less than 495 nanometers.

10. The device of claim 8, wherein the crossover wavelength is less than 480 nanometers.

11. The device of claim 8, wherein the device is a pair of spectacles.

12. The device of claim 8, wherein the electro-active material is a polarization insensitive cholesteric liquid crystal material comprising the nematic liquid crystal host.

13. The device of claim 8, wherein the substrate has a refractive index in a range from 1.64 to 1.7 at a wavelength of 550 nm.

14. The device of claim 8, wherein the nematic liquid crystal host has an average refractive index in a range from 1.62 to 1.68 at a wavelength of 550 nm.

* * * * *